US011042056B2

(12) United States Patent
Lentz

(10) Patent No.: US 11,042,056 B2
(45) Date of Patent: Jun. 22, 2021

(54) PHOTONIC CRYSTAL-ENABLED DISPLAY STITCHING

(71) Applicant: Government of the United States, as represented by the Secretary of the Air Force, Wright-Patterson AFB, OH (US)

(72) Inventor: Joshua K. Lentz, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 234 days.

(21) Appl. No.: 16/364,872

(22) Filed: Mar. 26, 2019

(65) Prior Publication Data

US 2020/0310179 A1   Oct. 1, 2020

(51) Int. Cl.
*G02F 1/1333* (2006.01)
*G09F 9/302* (2006.01)
*G06F 3/14* (2006.01)

(52) U.S. Cl.
CPC ........ *G02F 1/13336* (2013.01); *G06F 3/1446* (2013.01); *G09F 9/3026* (2013.01); *G02F 2202/32* (2013.01)

(58) Field of Classification Search
None
See application file for complete search history.

(56) References Cited

U.S. PATENT DOCUMENTS

| 7,414,594 B2 | 8/2008 | Kim et al. |
| 7,439,938 B2 | 10/2008 | Cho et al. |
| 7,615,398 B2 | 11/2009 | McKenzie et al. |
| 7,719,744 B2 | 5/2010 | Won et al. |

(Continued)

FOREIGN PATENT DOCUMENTS

| JP | 3815374 B2 | 8/2006 |
| KR | 20150019841 A | 2/2015 |

OTHER PUBLICATIONS

Anderson, P., et al., "Improving emission uniformity and linearizing band dispersion in nanowire arrays using quasi-aperiodicity," Optical Materials Express, vol. 7, No. 10, Oct. 1, 2017, pp. 3634-3642.

(Continued)

*Primary Examiner* — Thanh Nhan P Nguyen
(74) *Attorney, Agent, or Firm* — AFMCLO/JAZ; David E. Franklin

(57) ABSTRACT

A system, apparatus, and method include a first display device having a first set of pixels adapted to output light; a second display device having a second set of pixels adapted to output light; a first transparent plate spaced apart from each of the first display device and the second display device. The first transparent plate includes a first set of photonic crystal structures arranged in a first direction and adapted to deviate a first path of the light transmitted from the first and second set of pixels at a first angle. A second transparent plate is spaced apart from the first transparent plate and includes a second set of photonic crystal structures arranged in a second direction different from the first direction and adapted to deviate a second path of the light transmitted through the first transparent plate at a second angle to create a third path of light.

10 Claims, 15 Drawing Sheets

(56) References Cited

U.S. PATENT DOCUMENTS

| | | | |
|---|---|---|---|
| 7,768,023 B2 | 8/2010 | Diana et al. | |
| 7,772,606 B2 | 8/2010 | Cao et al. | |
| 7,903,239 B2 | 3/2011 | Sailor et al. | |
| 8,298,032 B2 | 10/2012 | Potts et al. | |
| 8,330,900 B2 | 12/2012 | Kuo et al. | |
| 8,363,303 B2 | 1/2013 | Horning et al. | |
| 8,648,771 B2 | 2/2014 | Hwu et al. | |
| 8,907,863 B2 | 12/2014 | Li | |
| 8,947,765 B2 | 2/2015 | Han et al. | |
| 9,157,856 B2 | 10/2015 | Guo et al. | |
| 9,195,092 B2 | 11/2015 | Escuti et al. | |
| 9,395,472 B2 | 7/2016 | Kim et al. | |
| 9,398,274 B2 | 7/2016 | Jeong et al. | |
| 9,454,339 B2 | 9/2016 | Han et al. | |
| 9,638,946 B2 | 5/2017 | Lee et al. | |
| 9,726,783 B2 | 8/2017 | Perrier-Cornet et al. | |
| 9,870,194 B2 | 1/2018 | Bang | |
| 2006/0028708 A1* | 2/2006 | Miles | G02B 26/02 359/290 |
| 2014/0070082 A1* | 3/2014 | Guo | G01N 21/59 250/227.14 |
| 2015/0036059 A1 | 2/2015 | Momonoi et al. | |
| 2016/0161822 A1 | 6/2016 | Kim et al. | |
| 2016/0259090 A1 | 9/2016 | Jiang et al. | |
| 2016/0316578 A1 | 10/2016 | Cha | |
| 2017/0123288 A1 | 5/2017 | Dmitriev et al. | |
| 2017/0159206 A1 | 6/2017 | Li et al. | |
| 2017/0163946 A1 | 6/2017 | Komanduri et al. | |
| 2018/0113320 A1 | 4/2018 | Lee | |
| 2018/0122143 A1 | 5/2018 | Ellwood, Jr. | |

OTHER PUBLICATIONS

Liu, X., et al., "Full-spectrum light management by pseudo-disordered moth-eye structures for thin film solar cells," Optics Express, vol. 25, No. 16, Aug. 7, 2017, pp. A824-A839.

Liu, L., et al., "A strain-tunable nanoimprint lithography for linear variable photonic crystal filters," Nanotechnology, vol. 27, No. 29, Jun. 8, 2016, pp. 1-6.

Rumpf, R., et al., "Spatially variant periodic structures in electromagnetics," Phil. Trans. R. Soc. A 373, Aug. 28, 2015, pp. 1-22.

Digaum, J., et al., "Beam-bending in spatially variant photonic crystals at telecommunications wavelengths," Proc. SPIE 9759, Advanced Fabrication Technologies for Micro/Nano Optics and Photonics IX, Mar. 14, 2016, pp. 375911-1 through 975911-6.

Beaulieu, M., et al., "Large-Area Printing of Optical Gratings and 3D Photonic Crystals Using Solution-Processable Nanoparticle/Polymer Composites," ACS Photonics 2014, 1(9), Aug. 11, 2014, pp. 799-805.

Sun, T. et al. "Photonic crystal structures on nonflat surfaces fabricated by dry lift-off soft UV nanoimprint lithography," Journal of Micromechanics and Microengineering, vol. 23, No. 12, Oct. 30, 2013, pp. 1-7.

Calafiore, G., et al., "Printable photonic crystals with high refractive index for applications in visible light," Nanotechnology, vol. 27, No. 11, Feb. 15, 2016, pp. 1-7.

Pazos, J., "Digitally Manufactured Spatially Variant Photonic Crystals," Doctoral Dissertation, Department of Electrical and Computer Engineering, The University of Texas at El Paso, 2014, 102 pages.

* cited by examiner

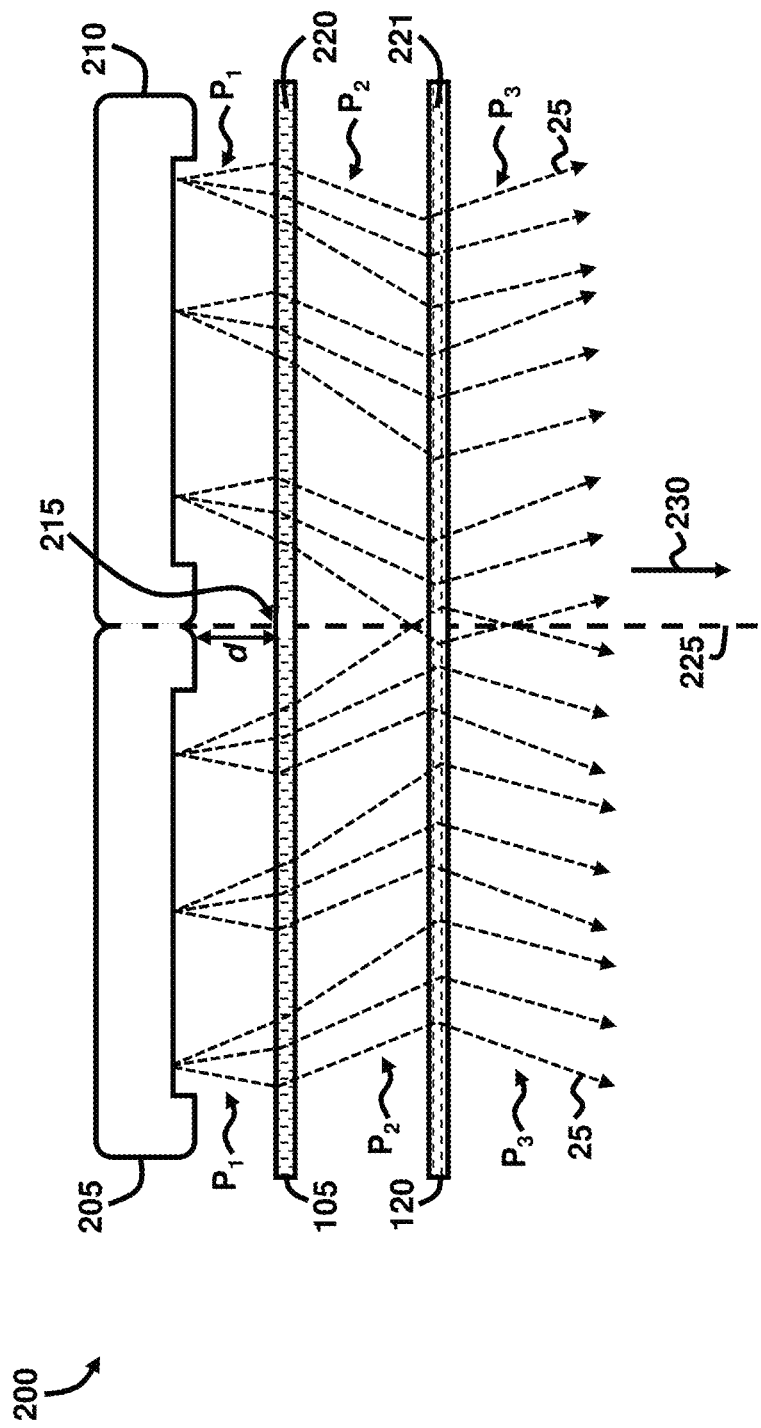

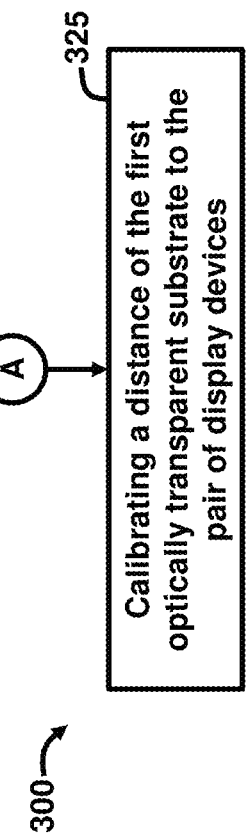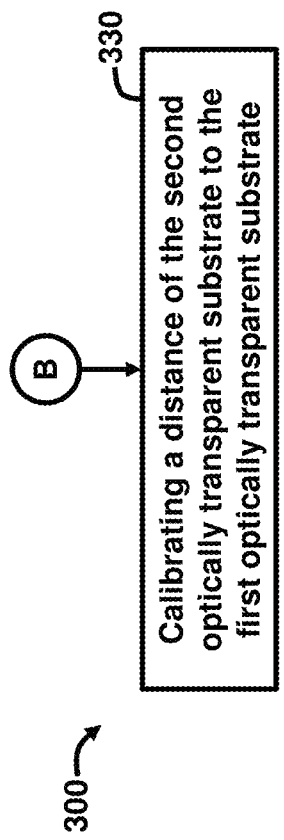

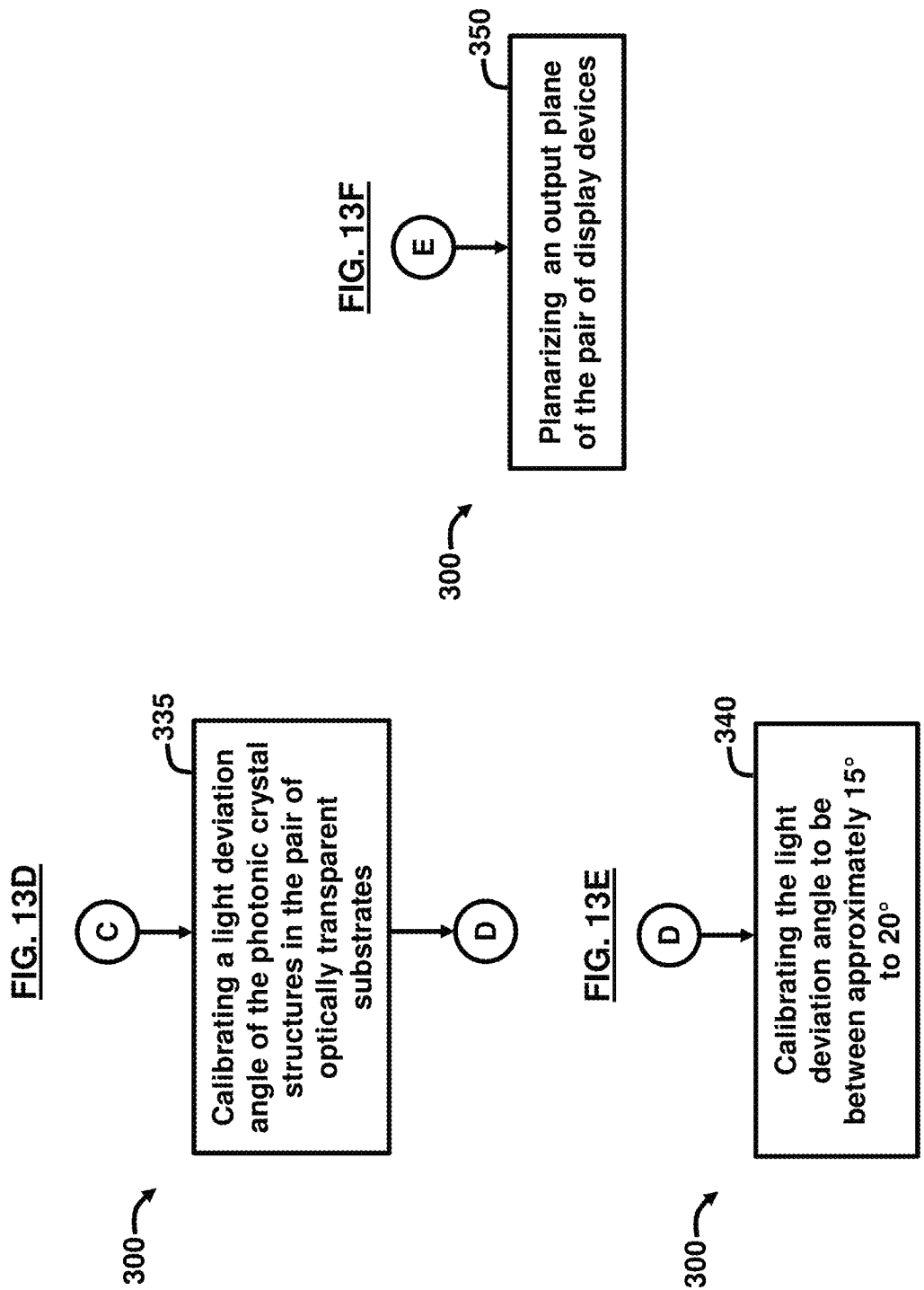

PHOTONIC CRYSTAL-ENABLED DISPLAY STITCHING

GOVERNMENT INTEREST

The invention described herein may be manufactured and used by or for the Government of the United States for all government purposes without the payment of any royalty.

BACKGROUND

Field of the Invention

The embodiments herein generally relate to electronic display systems, and more particularly to projection displays for increased and enhanced viewing sizes.

Background of the Invention

In many cases, larger displays are desired than single television monitors or computer monitors can provide. Similarly, for projection systems, larger format spatial light modulators (SLMs) such as light emitting diode (LED) arrays, digital micro-mirror devices, etc. are often desired but cost increases significantly with increased numbers of pixel elements as fabrication yields decrease with size. In both cases, a desirable solution would use a method of "stitching" displays or SLM devices together optically. However, simply butting devices against each other allows much larger displays but has the highly undesirable effect of "seams" between displays such as television or monitor frames or electronic addressing hardware.

This problem is illustrated in FIG. 1. The original image 5 is on the left and it is desired to display the image 5 on a much larger display, beyond the limits of available televisions and monitors. By using four or more smaller display devices 6a-6d, an overall larger display 6 can be accomplished, but with an undesired "tiling" effect from the frames of the individual devices 6a-6d causing a segmented view of the image 5. Accordingly, it would be desirable to achieve a larger display size of an image 5 without the undesired "tiling" effect.

BRIEF SUMMARY OF THE INVENTION

In view of the foregoing, an embodiment herein provides a system comprising a first display device comprising a first set of pixels adapted to output light; a second display device comprising a second set of pixels adapted to output light; a first transparent plate spaced apart from each of the first display device and the second display device, wherein the first transparent plate comprises a first set of photonic crystal structures arranged in a first direction and adapted to deviate a first path of the light transmitted from the first and second set of pixels at a first angle; and a second transparent plate spaced apart from the first transparent plate and comprising a second set of photonic crystal structures arranged in a second direction different from the first direction and adapted to deviate a second path of the light transmitted through the first transparent plate at a second angle to create a third path of light.

The first display device may comprise a first frame that does not contain the first set of pixels, and wherein the second display device comprises a second frame that does not contain the second set of pixels. The first display device and the second display device may be proximate to one another such that the first frame and the second frame are aligned to create an optical stitching plane that does not contain the first set of pixels and the second set of pixels. The optical stitching plane may comprise an image viewing area overlapping a portion of the first frame and the second frame. The third path of light may permit a display of light in the image viewing area.

The first transparent plate and the second transparent plate may each extend a combined length of the first display device and the second display device, and wherein the first set of photonic crystal structures and the second set of photonic crystal structures are each discontinuous at the optical stitching plane. The first set of photonic crystal structures may be arranged in the first direction is adapted to deviate the first path of the light in a first angular deviation. The second set of photonic crystal structures may be arranged in the second direction is adapted to deviate the second path of the light in a second angular deviation that is opposite to the first angular deviation. The first angular deviation may be $\alpha$ for the first set of photonic crystal structures and the second angular deviation may be $-\alpha$ for the second set of photonic crystal structures with respect to the first transparent plate and the second transparent plate arranged in front of the first display device. The first angular deviation may be $-\alpha$ for the first set of photonic crystal structures and the second angular deviation may be $\alpha$ for the second set of photonic crystal structures with respect to the first transparent plate and the second transparent plate arranged in front of the second display device.

An apparatus comprising a first optically transparent substrate comprising a first set of photonic crystal structures adapted to deviate a first path of the light received from a first pair of discrete display devices; and a second optically transparent substrate spatially aligned with the first optically transparent substrate and comprising a second set of photonic crystal structures adapted to deviate a second path of the light transmitted through the first transparent substrate to create a third path of light. The junction of the first pair of discrete display devices may create an optical stitching plane, and wherein the first set of photonic crystal structures and the second set of photonic crystal structures are discontinuous at the optical stitching plane.

The first optically transparent substrate may be adapted to receive the first path of light from a second pair of discrete display devices, and wherein first pair of discrete display devices and the second pair of discrete display devices display a combined third path of light to include a region comprising the optical stitching plane. The first optically transparent substrate may be adapted to receive the first path of light from multiple pairs of discrete display devices arranged in a two-dimensional array. The first set of photonic crystal structures and the second set of photonic crystal structures may be configured to have opposite light deviation angles from each other. The first path of the light received from a first device of the first pair of discrete display devices may be unaltered, and the first path of the light received from a second device of the first pair of discrete display devices may be laterally offset toward the first device.

Another embodiment provides a method of combining an output from multiple display devices, the method comprising measuring a distance between a non-viewable display area between a pair of display devices; aligning a pair of optically transparent substrates with respect to the pair of display devices, wherein the pair of optically transparent substrates comprise a first optically transparent substrate and a second optically transparent substrate, wherein the first optically transparent substrate is positioned between the pair of display devices and a second optically transparent substrate, and wherein the pair of optically transparent substrates comprise photonic crystal structures; and outputting light from the pair of display devices; and combining the output light from the pair of display devices in the non-viewable display area upon projecting the output light through the aligned pair of optically transparent substrates.

The aligning may comprise calibrating a distance of the first optically transparent substrate to the pair of display devices. The aligning may comprise calibrating a distance of the second optically transparent substrate to the first optically transparent substrate. The method may comprise calibrating a light deviation angle of the photonic crystal structures in the pair of optically transparent substrates. The method may comprise calibrating the light deviation angle to be between approximately 15° to 20°. The method may comprise planarizing an output plane of the pair of display devices.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 12 is a schematic diagram illustrating an apparatus for outputting light, according to an embodiment herein;

FIG. 13B is a flow diagram illustrating a method of calibrating a distance of a first substrate from a display device, according to an embodiment herein;

FIG. 13C is a flow diagram illustrating a method of calibrating a distance of a second substrate from a display device, according to an embodiment herein;

FIG. 13D is a flow diagram illustrating a method of calibrating a light deviation angle in photonic crystal structures, according to an embodiment herein;

FIG. 13E is a flow diagram illustrating a method of calibrating a light deviation angle at a specified range in photonic crystal structures, according to an embodiment herein; and FIG. 13F is a flow diagram illustrating a method of planarizing an output plane in a pair of display devices, according to an embodiment herein.

DETAILED DESCRIPTION OF THE INVENTION

Figure 1:
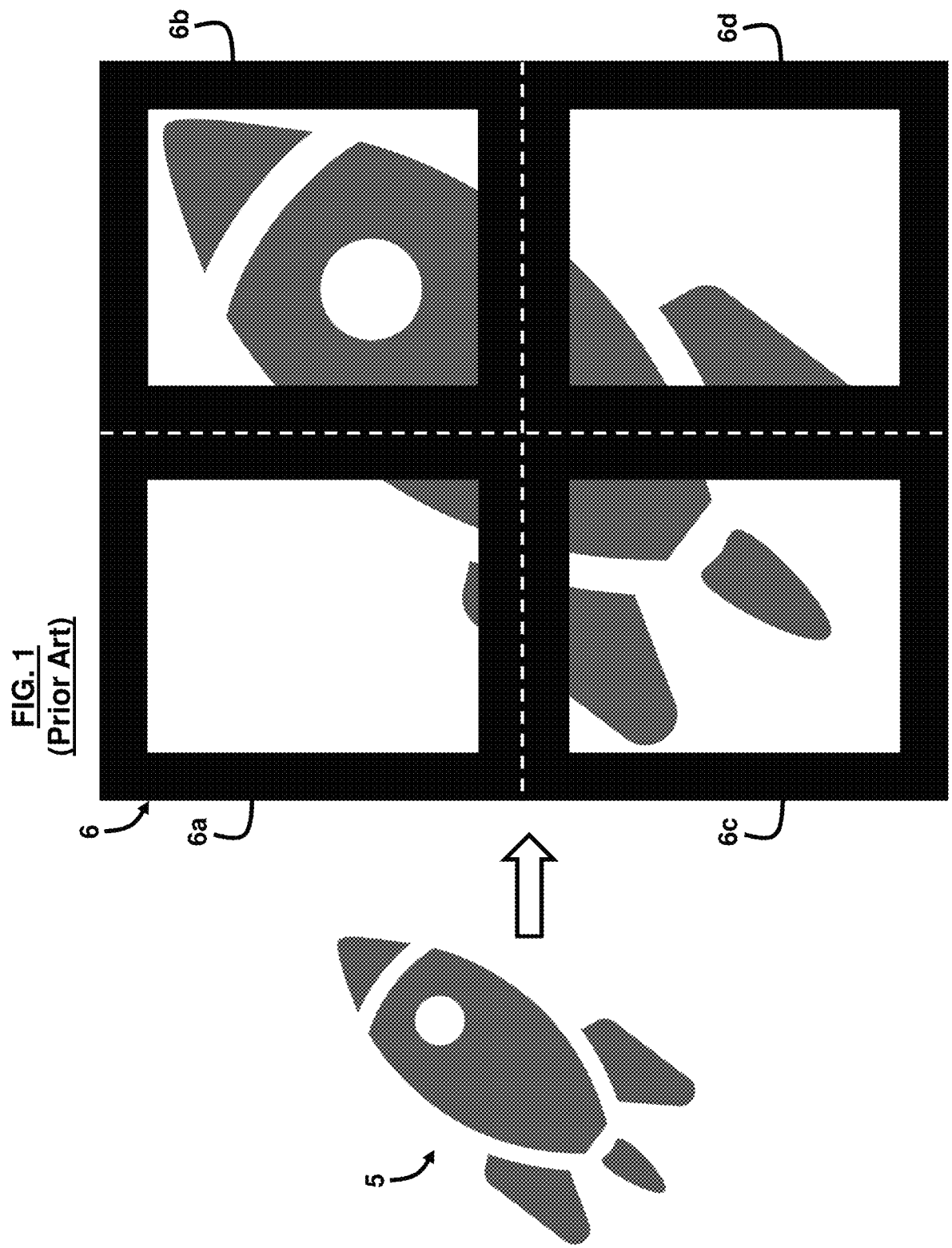
FIG. 1 is a schematic diagram illustrating a conventional approach to enlarging a display of an image.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

According to various examples, the embodiments herein provide a technique for stitching the outputs of display devices such as computer monitors, televisions or spatial light modulators to create frame-less, large format displays. The stitching method utilizes photonic crystals deposited on an optically clear substrate. The photonic crystals deviate the output of a display toward another display, and a second photonic crystal structure on a second substrate deviates the output back to a direction parallel to the initial device output. The net result is a laterally offset apparent source location as desired. Each pair of photonic crystal structures has a first photonic crystal structure that deviates the light output by an angle $\alpha$ and a second photonic crystal structure that provides an angular deviation of $-\alpha$, compensating for the first photonic structure. The two pairs of photonic crystal structures differ in that for the first device, the deviations are $\alpha$ then $-\alpha$, but in the second device, the deviations are the opposite, namely, $-\alpha$ then $\alpha$. The outputs of two devices are optically stitched together along the vertical line separating the devices. In an example, a ray from each of the pixels closest to the device division is deviated at an abnormally wide angle from the last photonic crystal devices.

Referring now to the drawings, and more particularly to FIGS. 2 through 13F where similar reference characters denote corresponding features consistently throughout, there are shown exemplary embodiments. In the drawings, the size and relative sizes of components, layers, and regions may be exaggerated for clarity.

Figure 2:
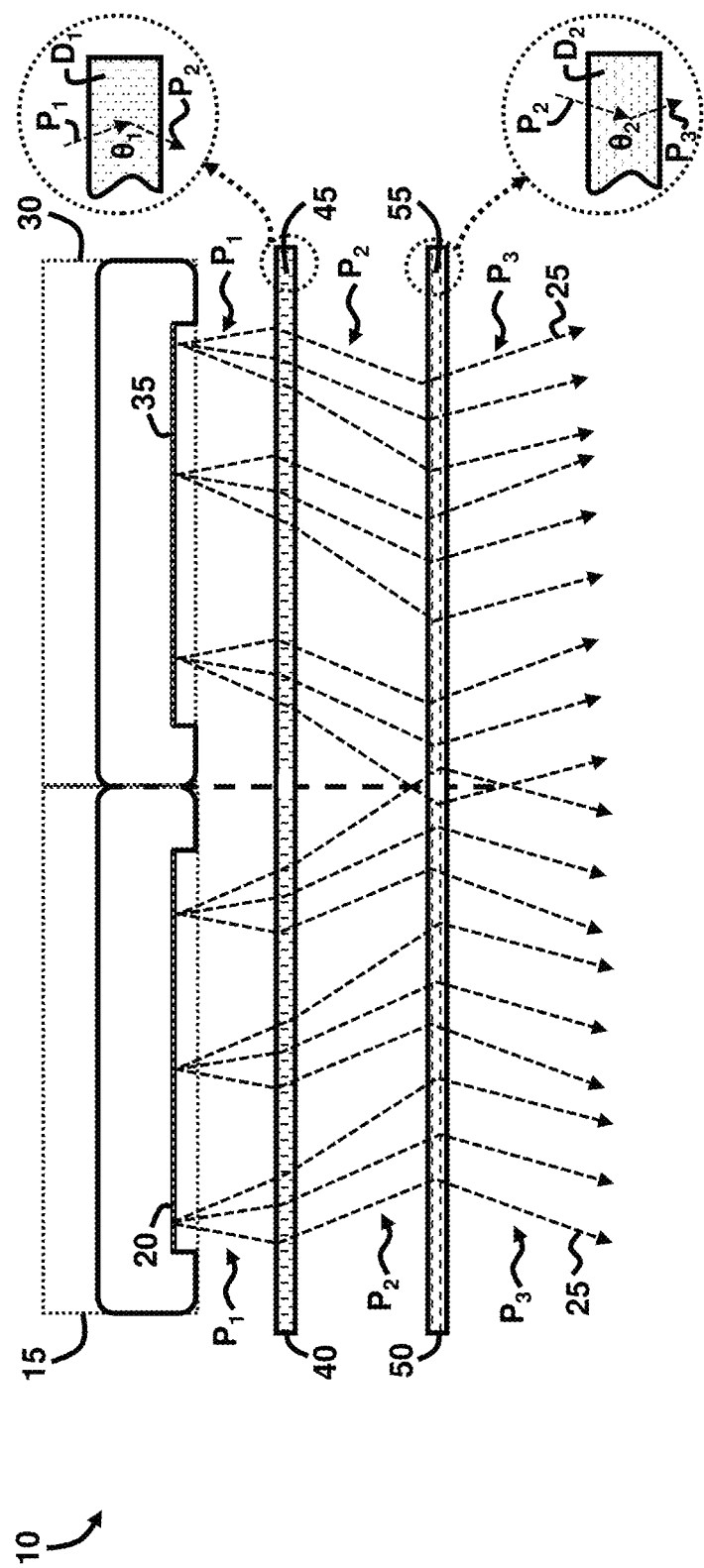
FIG. 2 is a schematic diagram illustrating a system for enlarging the display of an image, according to an embodiment herein.

FIG. 2 illustrates a system 10 comprising a first display device 15 comprising a first set of pixels 20 adapted to output light 25. In some examples, the first display device 15 may comprise a computer monitor, television monitor, or any other type of electronic display. In some examples, the first display device 15 may comprise any of a liquid crystal display (LCD), plasma, LED, organic light emitting diode (OLED), cathode ray tube (CRT), high definition (HD), ultra-high definition (UHD), and thin-film transistor (TFT) displays. In an example, the first set of pixels 20 may comprise picture elements containing a combination of red, green, blue, cyan, magenta, yellow, and black color intensities. The light 25 may be emitted in a substantially uniform manner or may be directed non-uniformly according to various examples.

The system 10 comprises a second display device 30 comprising a second set of pixels 35 adapted to output light 25. Similarly, in some examples, the second display device 30 may comprise a computer monitor, television monitor, or any other type of electronic display. In some examples, the first display device 15 may comprise any of a LCD, plasma, LED, OLED, CRT, HD, UHD, and TFT displays. In an example, the second set of pixels 35 may comprise picture elements containing a combination of red, green, blue, cyan, magenta, yellow, and black color intensities. The light 25 may be emitted in a substantially uniform manner or may be directed non-uniformly according to various examples.

The system 10 comprises a first transparent plate 40 spaced apart from each of the first display device 15 and the second display device 30. The spacing (e.g., distance) between the first transparent plate 40 and the first display device 15 and the second display device 30 may be set to any suitable distance, which may be based, in part, on the type of the first display device 15 and the second display device 30 and the configuration (i.e., thickness, etc.) of the first transparent plate 40. Furthermore, the spacing may be adjusted either manually by a user or by an automated controller based on sensing a desired transmission of light 25 through the first transparent plate 40. In some examples, the first transparent plate 40 may comprise glass, poly (methyl methacrylate) (PMMA), polyimide, plastic material, sapphire, polycarbonates, polymers, zinc-selenide, etc. The first transparent plate 40 may be flexible or rigid and may be configured at a sufficiently thin thickness (e.g., 1-4 mm) to permit the light 25 to pass therethrough. The first transparent plate 40 comprises a first set of photonic crystal structures 45 arranged in a first direction $D_1$ and adapted to deviate a first path $P_1$ of the light 25 transmitted from the first and second set of pixels 20, 35 at a first angle $\theta_1$. The deviation of the first path $P_1$ of the light 25 creates a second path $P_2$ of the light 25 from the first transparent plate 40. In some examples, the first set of photonic crystal structures 45 may comprise any of periodic dielectric, metallo-dielectric, and superconductor microstructures or nanostructures, which may be configured as any of one-dimensional, two-dimensional, and three-dimensional crystals.

The first direction $D_1$ is adapted to be uniform such that all of the crystals in the first set of photonic crystal structures 45 in front of the first display device 15 are set to be positioned in a substantially uniform (e.g., the substantially same) direction (e.g., the first direction $D_1$). Moreover, the first direction $D_1$ is adapted to be uniform such that all of the crystals in the first set of photonic crystal structures 45 in front of the second display device 30 are set to be positioned in a substantially uniform (e.g., the substantially same) direction (e.g., the first direction $D_1$). However, the first direction $D_1$ corresponding to the first set of photonic crystal structures 45 in front of the first display device 15 is offset from the first direction $D_1$ corresponding to the first set of photonic crystal structures 45 in front of the second display device 30. This offset in the orientation of the first direction $D_1$ in the first set of photonic crystal structures 45 may be accomplished by creating an area of discontinuity (further described below) in the first transparent plate 40 to separate the first set of photonic crystal structures 45 in front of the first display device 15 and the first set of photonic crystal structures 45 in front of the second display device 30.

The first path $P_1$ of light 25 is set to be substantially uniform (e.g., the substantially same) direction. The direction or orientation of the first path $P_1$ of light 25 may be controlled by LED circuitry (not shown), for example, in the first display device 15 and second display device 30. According to an example, the first angle $\theta_1$ may be set at any suitable angle such that there is a deviation in the first path $P_1$ of light 25 transmitted from the first and second set of pixels 20, 35. The deviation of the first path $P_1$ of light 25 occurs as the light 25 traverses through the first transparent plate 40, and the orientation of the first set of photonic crystal structures 45 arranged in a first direction $D_1$ is configured to cause the deviation of the first path $P_1$ of light 25 as the light 25 hits the first set of photonic crystal structures 45. The first angle $\theta_1$ may be controlled based on the orientation of the first set of photonic crystal structures 45 in the first transparent plate 40. In an example, the first direction $D_1$ of the first set of photonic crystal structures 45 may be set to be unalterable. In another example, the first direction $D_1$ of the first set of photonic crystal structures 45 may be set to be alterable by applying any of an electrical, magnetic, and electromagnetic signal to the first transparent plate 40 thereby causing a change in the orientation (e.g., a change in the first direction $D_1$) of the first set of photonic crystal structures 45 in the first transparent plate 40.

The system 10 comprises a second transparent plate 50 spaced apart from the first transparent plate 40 and comprising a second set of photonic crystal structures 55 arranged in a second direction $D_2$ different from the first direction $D_1$ and adapted to deviate a second path $P_2$ of the light 25 transmitted through the first transparent plate 40 at a second angle $\theta_2$ to create a third path $P_3$ of light 25. The second angle $\theta_2$ may be different from the first angle $\theta_1$, and in an example the second angle $\theta_2$ may be equal and opposite to the first angle $\theta_1$. The spacing (e.g., distance) between the second transparent plate 50 and the first transparent plate 40 may be set to any suitable distance, which may be based, in part, on the respective configurations (i.e., thickness, etc.) of the first transparent plate 40 and the second transparent plate 50. Furthermore, the spacing may be adjusted either manually by a user or by an automated controller based on sensing a desired transmission of light 25 through the first transparent plate 40 and the second transparent plate 50. In some examples, the second transparent plate 50 may comprise glass, PMMA, polyimide, plastic material, sapphire, polycarbonates, polymers, zinc-selenide, etc. The second transparent plate 50 may be flexible or rigid and may be configured at a sufficiently thin thickness (e.g., 1-4 mm) to permit the light 25 to pass therethrough. The respective thicknesses of the first transparent plate 40 and the second transparent plate 50 may be the same or different from one another. The second transparent plate 50 comprises a second set of photonic crystal structures 55 arranged in a second direction $D_2$ and adapted to deviate the second path $P_2$ of the light 25 from the first transparent plate 40 at a second angle $\theta_2$. The deviation of the second path $P_2$ of the light 25 creates a third path $P_3$ of the light 25 from the second transparent plate 50.

In some examples, the second set of photonic crystal structures 55 may comprise any of periodic dielectric, metallo-dielectric, and superconductor microstructures or nanostructures, which may be configured as any of one-dimensional, two-dimensional, and three-dimensional crystals.

The second direction $D_2$ is adapted to be uniform such that all of the crystals in the second set of photonic crystal structures 55 in front of the first display device 15 are set to be positioned in a substantially uniform (e.g., the substantially same) direction (e.g., the second direction $D_2$). Moreover, the second direction $D_2$ is adapted to be uniform such that all of the crystals in the second set of photonic crystal structures 55 in front of the second display device 30 are set to be positioned in a substantially uniform (e.g., the substantially same) direction (e.g., the second direction $D_2$). However, the second direction $D_2$ corresponding to the second set of photonic crystal structures 55 in front of the first display device 15 is offset from the second direction $D_2$ corresponding to the second set of photonic crystal structures 55 in front of the second display device 30. This offset in the orientation of the second direction $D_2$ in the second set of photonic crystal structures 55 may be accomplished by creating an area of discontinuity (further described below) in the second transparent plate 50 to separate the second set of photonic crystal structures 55 in front of the first display device 15 and the second set of photonic crystal structures 55 in front of the second display device 30.

The second path $P_2$ of light 25 is set to be substantially uniform (e.g., the substantially same) direction. The direction or orientation of the second path $P_2$ of light 25 may be controlled by LED circuitry (not shown), for example, in the first display device 15 and second display device 30, which may be operatively connected to the first transparent plate 40. According to an example, the second angle $\theta_2$ may be set at any suitable angle such that there is a deviation in the second path $P_2$ of light 25 from the first transparent plate 40. The deviation of the second path $P_2$ of light 25 occurs as the light 25 traverses through the second transparent plate 50, and the orientation of the second set of photonic crystal structures 55 arranged in a second direction $D_2$, which is configured to be different than the orientation of the first direction $D_1$, and which is further configured to cause the deviation of the second path $P_2$ of light 25 as the light 25 hits the second set of photonic crystal structures 55. The second angle $\theta_2$ may be controlled based on the orientation of the second set of photonic crystal structures 55 in the second transparent plate 50. In an example, the second direction $D_2$ of the second set of photonic crystal structures 55 may be set to be unalterable. In another example, the second direction $D_2$ of the second set of photonic crystal structures 55 may be set to be alterable by applying any of an electrical, magnetic, and electromagnetic signal to the second transparent plate 50 thereby causing a change in the orientation (e.g., a change in the second direction $D_2$) of the second set of photonic crystal structures 55 in the second transparent plate 50.

Each pair of photonic crystal structures (e.g., first set of photonic crystal structures 45 and second set of photonic crystal structures 55) in front of the first display device 15 as well as each pair of photonic crystal structures (e.g., first set of photonic crystal structures 45 and second set of photonic crystal structures 55) in front of the second display device 30 has a first photonic crystal structure (e.g., first set of photonic crystal structures 45) that deviates the light output by a deviation angle $\alpha$ (e.g., first angle $\theta_1$, in an example) and a second photonic crystal structure (e.g., second set of photonic crystal structures 55) that provides an angular deviation of $-\alpha$ (e.g., second angle $\theta_2$, in an example), compensating for the first set of photonic crystal structures 45. As used herein, the deviation angle $\alpha$ may correspond to the first angle $\theta_1$, and the deviation angle $-\alpha$ may correspond to the second angle $\theta_2$, as further described with reference to FIG. 6.

In an example, the two pairs of photonic crystal structures (e.g., first set of photonic crystal structures 45 and second set of photonic crystal structures 55) in front of the first display device 15 as well as each pair of photonic crystal structures (e.g., first set of photonic crystal structures 45 and second set of photonic crystal structures 55) in front of the second display device 30 differ in that for the first set of photonic crystal structures 45 in front of the first display device 15, the deviations are $\alpha$, and then $-\alpha$ for the second set of photonic crystal structures 55. However, with respect to the second display device 30, the deviations are the opposite; namely, $-\alpha$ for the first set of photonic crystal structures 45 and then $\alpha$ for the second set of photonic crystal structures 55.

Figure 3:
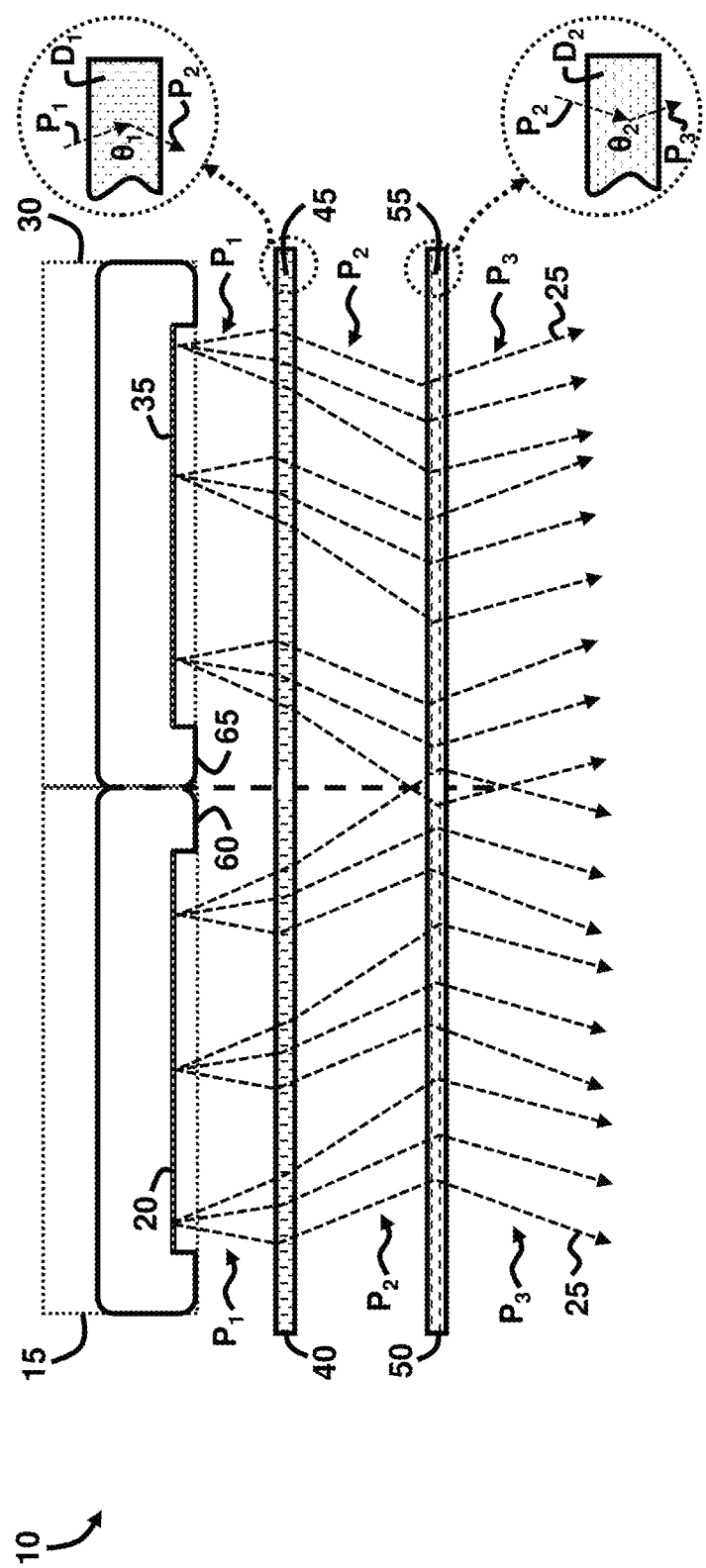
FIG. 3 is a schematic diagram illustrating frames of the display devices in the system of FIG. 2, according to an embodiment herein.

FIG. 3, with reference to FIG. 2, illustrates that the first display device 15 comprises a first frame 60 that does not contain the first set of pixels 20, and the second display device 30 comprises a second frame 65 that does not contain the second set of pixels 35. For example, the first frame 60 and the second frame 65 may be structural housing components of the first display device 15 and second display device 30, respectively. The configuration of the first frame 60 and the second frame 65 of not containing the first set of pixels 20 and the second set of pixels 35, respectively, results in no light 25 being output from the first frame 60 and second frame 65, respectively.

Figure 4:
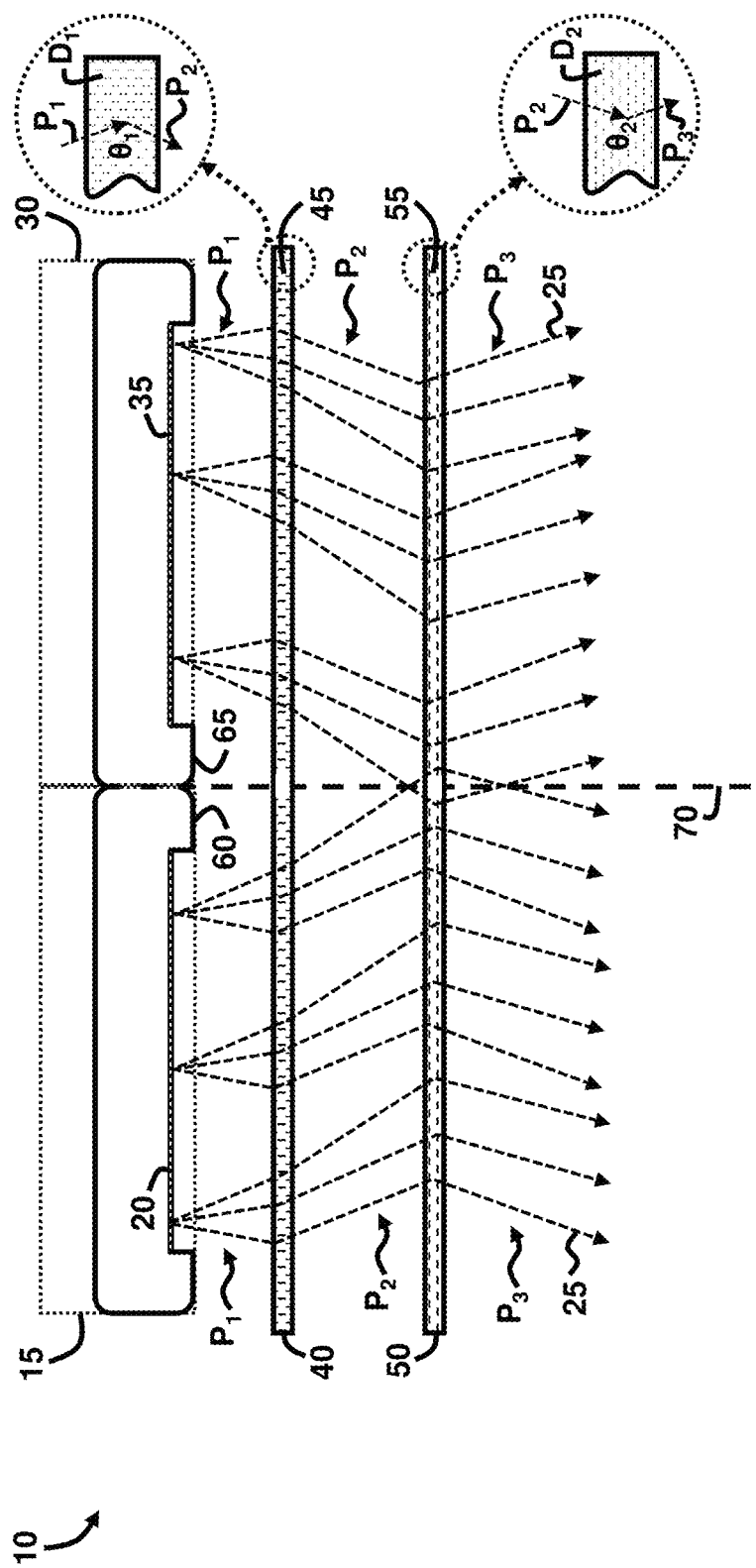
FIG. 4 is a schematic diagram illustrating an optical stitching plane in the system of FIG. 2, according to an embodiment herein.

FIG. 4, with reference to FIGS. 2 and 3, illustrates that the first display device 15 and the second display device 30 are proximate to one another such that the first frame 60 and the second frame 65 are aligned to create an optical stitching plane 70 that does not contain the first set of pixels 20 and the second set of pixels 35. The outputs of two devices (e.g., the first display device 15 and the second display device 30) are optically stitched together along the optical stitching plane 70 separating the first display device 15 and the second display device 30. At least one ray of light 25 from each of the pixels closest to the device division (e.g., optical stitching plane 70) is deviated at an abnormally wide angle (e.g., over 20°, for example) from the respective first display device 15 and second display device 30. This leads to a drop in usable output radiance of pixels nearest the stitching line (e.g., optical stitching plane 70). Corrective compensation can be performed in image generation. In an example, this process can be accomplished with just a pair of photonic crystals (e.g., first set of photonic crystal structures 45 and second set of photonic crystal structures 55) such that the light 25 output from the first display device 15 is unaltered (e.g., no angular deviation of the light 25) and the light 25 output from the second display device 30 is laterally offset toward the first display device 15.

Figure 5:
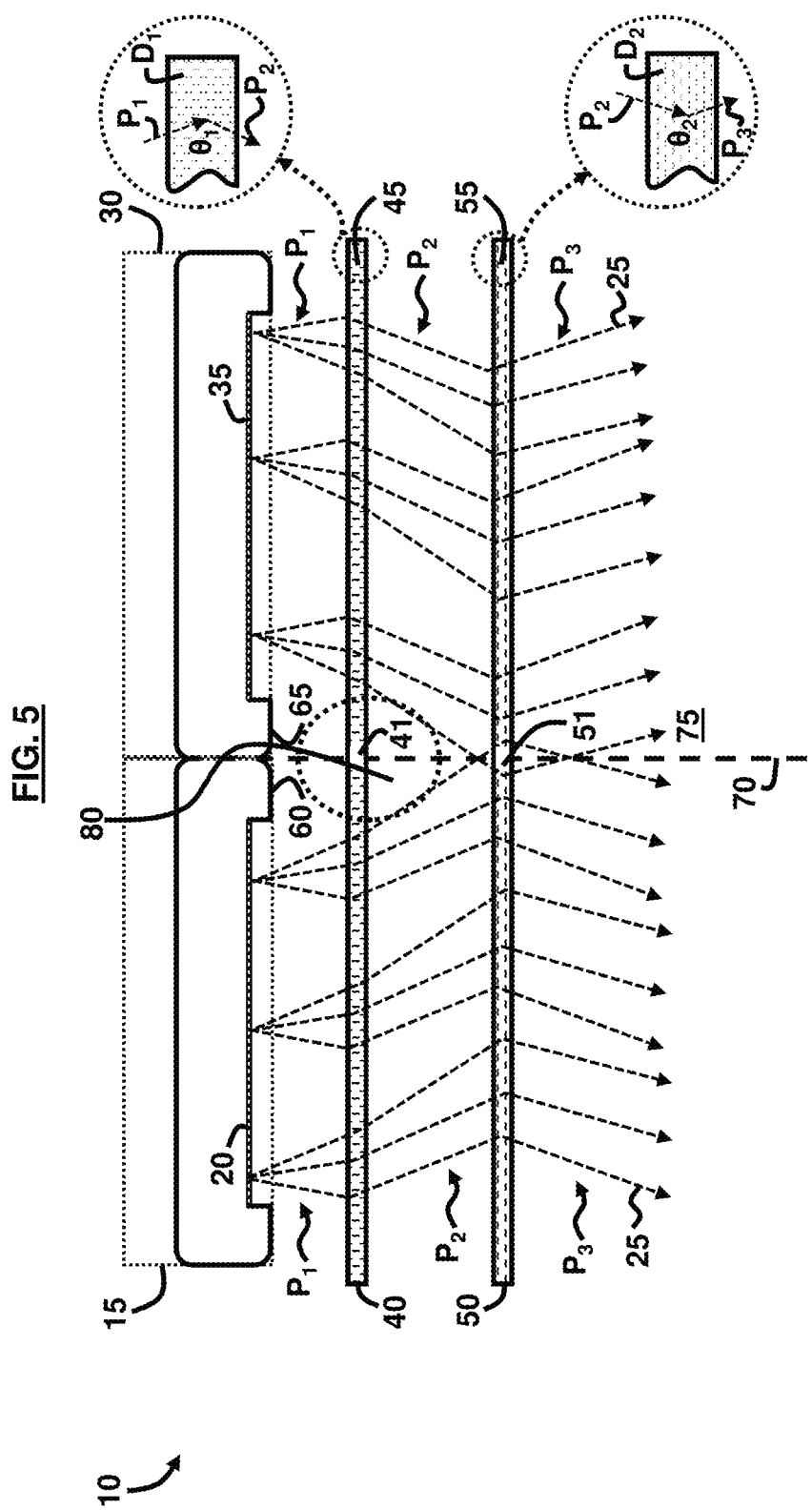
FIG. 5 is a schematic diagram illustrating an image viewing area in the system of FIG. 2, according to an embodiment herein.

FIG. 5, with reference to FIGS. 2 through 4, illustrates that the optical stitching plane 70 comprises an image viewing area 75 overlapping a portion 80 of the first frame 60 and the second frame 65. The third path $P_3$ of light 25 permits a display of light 25 in the image viewing area 75 to permit a user to view an enlarged image projected by way of the output light 25. The first transparent plate 40 and the second transparent plate 50 each extend a combined length of the first display device 15 and the second display device 30. This configuration permits all of the light 25 transmitted by the first display device 15 and the second display device 30 to enter into the first transparent plate 40, and similarly into the second transparent plate 50. Moreover, this configuration permits the first transparent plate 40 and the second transparent plate 50 to include all display output optical energy provided by the light 25 transmitted by the first display device 15 and the second display device 30.

In an example, the first transparent plate 40 and the second transparent plate 50 may have the same length as each other. In another example, the first transparent plate 40 and the second transparent plate 50 may have a different length as each other. According to an embodiment herein, the first set of photonic crystal structures 45 and the second set of photonic crystal structures 55 are each discontinuous at the optical stitching plane 70. Accordingly, there is a first discontinuous zone 41 in the first transparent plate 40 and a second discontinuous zone 51 in the second transparent plate 50 that align with the optical stitching plane 70. This discontinuity at the optical stitching plane 70 permits the first set of photonic crystals 45 and the second set of photonic crystals 55 to be configured at with different angular orientations α, −α depending on the position with respect to the first display device 15 and the second display device 30.

The first set of photonic crystals 45 and second set of photonic crystals 55 in the first transparent plate 40 and second transparent plate 50 are discontinuous at the optical stitching plane 70, with one side having the negative angular deviation −α of the first angular deviation α. Thus, both of the first set of photonic crystals 45 and second set of photonic crystals 55 both divert the display output optical energy toward the center (e.g., optical stitching plane 70) with the same angular magnitude.

The first discontinuous zone 41 and the second discontinuous zone 51 at the optical stitching plane 70 is where the deviation angles flip sign (e.g., from α to −α, or from −α to α). Furthermore, the second set of photonic crystals 55 in the second transparent plate 50 compensates for the change in the path of the light 25 from the first path $P_1$ to the second path $P_2$ caused by the deviation caused by the first set of photonic crystals 45 in the first transparent plate 40, and accordingly the second set of photonic crystal structures 55 in the second transparent plate 50 returns the angular orientation of the light 25 to what it was prior to the first set of photonic crystals 45, but now, with a lateral offset in position. The exception on the angle is the region (e.g., portion 80 of the first frame 60 and the second frame 65) where energy from the first display device 15 extends to the photonic crystals associated with the second display device 30.

In order for the first set of photonic crystals 45 and second set of photonic crystals 55 to have the beam diverting properties necessary, they are configured as spatially variant photonic crystals, which are self-collimating while re-directing energy at an angle of 90°. However, other, lower angular deviations are also possible using the same techniques in accordance with the embodiments herein. Moreover, the fabrication methods for the first transparent plate 40 and the second transparent plate 50 are generally specific to the photonic crystal design selected.

Figure 6:
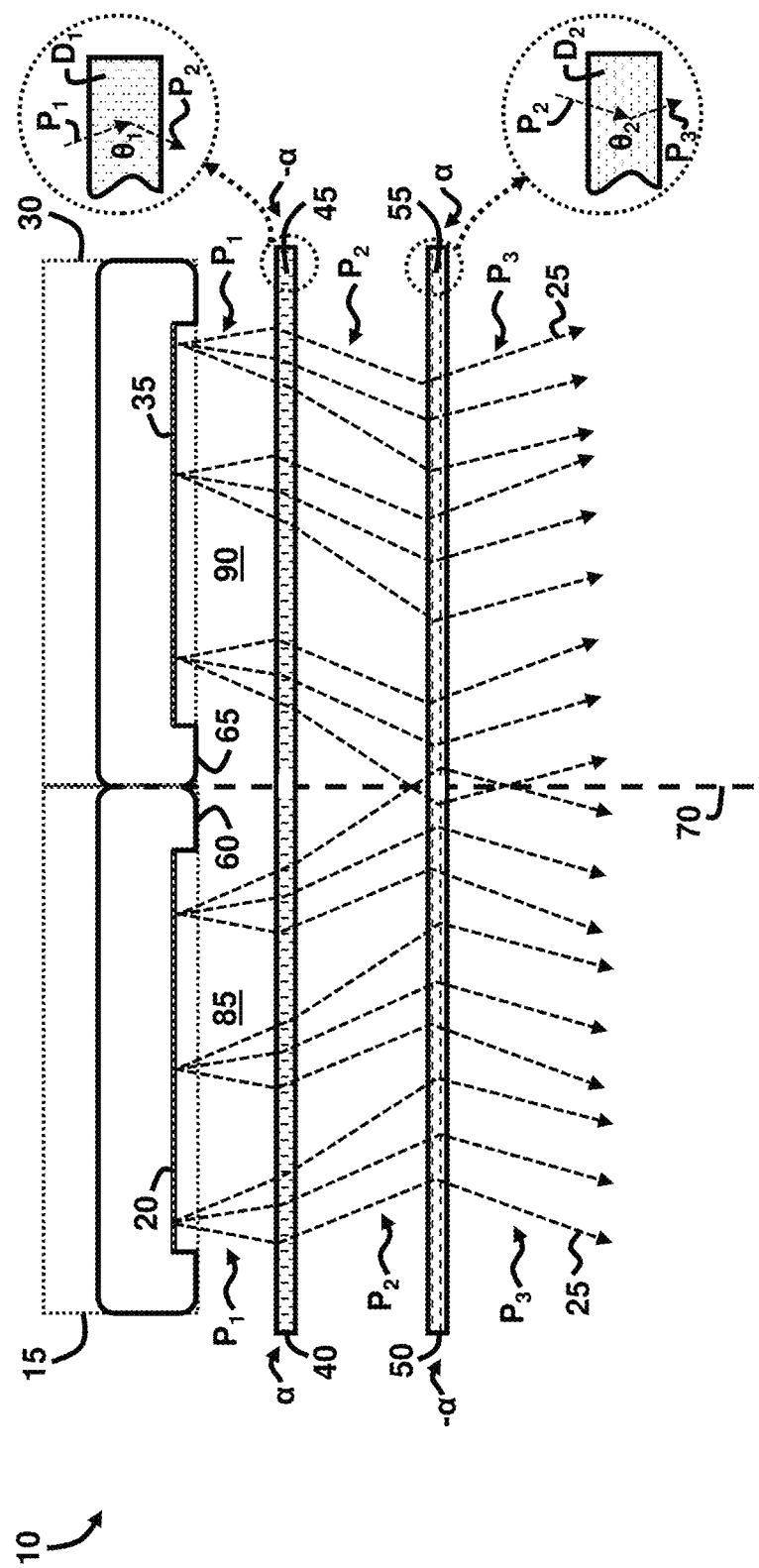
FIG. 6 is a schematic diagram illustrating angular deviations of the paths of light in the system of FIG. 2, according to an embodiment herein.

To further illustrate the above concepts, FIG. 6, with reference to FIGS. 2 through 5, illustrates that the first set of photonic crystal structures 45 arranged in the first direction $D_1$ is adapted to deviate the first path $P_1$ of the light 25 in a first angular deviation α, and wherein the second set of photonic crystal structures 55 arranged in the second direction $D_2$ is adapted to deviate the second path $P_2$ of the light in a second angular deviation −α that is opposite to the first angular deviation α. The first angular deviation is α for the first set of photonic crystal structures 45 and the second angular deviation is −α for the second set of photonic crystal structures 55 with respect to the first transparent plate 40 and the second transparent plate 50 arranged in front 85 of the first display device 15. The first angular deviation is −α for the first set of photonic crystal structures 45 and the second angular deviation is α for the second set of photonic crystal structures 55 with respect to the first transparent plate 40 and the second transparent plate 50 arranged in front 90 of the second display device 30.

Figure 7:
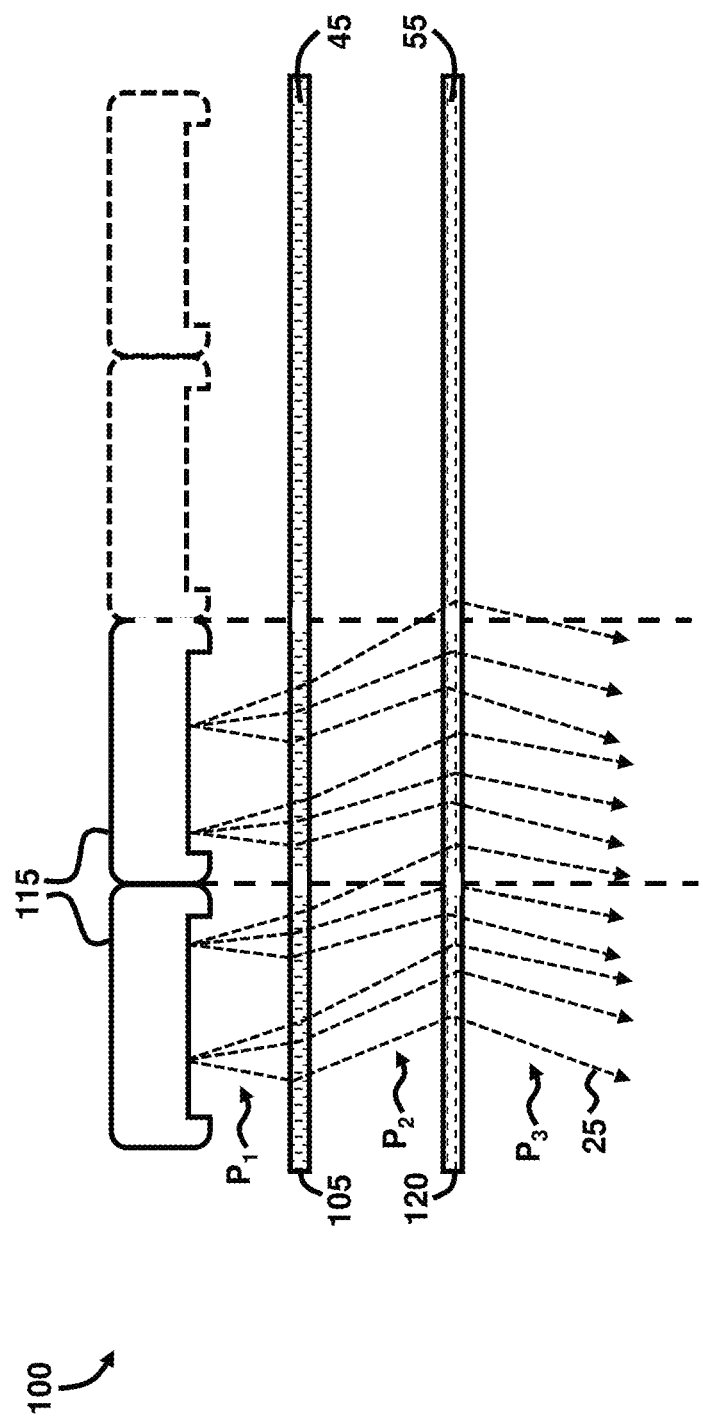
FIG. 7 is a schematic diagram illustrating an apparatus for enlarging an image, according to an embodiment herein.

FIG. 7, with reference to FIGS. 2 through 6, illustrates an apparatus 100 comprising a first optically transparent substrate 105 comprising a first set of photonic crystal structures 45 adapted to deviate a first path $P_1$ of the light 25 received from a first pair of discrete display devices 115. The light 25 may be emitted in a substantially uniform manner or may be directed non-uniformly according to various examples. The apparatus 100 further comprises a second optically transparent substrate 120 spatially aligned with the first optically transparent substrate 105 and comprising a second set of photonic crystal structures 55 adapted to deviate a second path $P_2$ of the light 25 transmitted through the first transparent substrate 105 to create a third path $P_3$ of light 25. The spatial alignment (e.g., distance) between the first optically transparent substrate 105 and the second optically transparent substrate 120 may be set to any suitable distance, which may be based, in part, on the type of the first pair of discrete display devices 115 and the configuration (i.e., thickness, etc.) of the first optically transparent substrate 105 and the second optically transparent substrate 120. Furthermore, the spacing may be adjusted either manually by a user or by an automated controller based on sensing a desired transmission of light 25 through the first optically transparent substrate 105 and the second optically transparent substrate 120.

The material for the first optically transparent substrate 105 and the second optically transparent substrate 120 may be chosen based on the spectrum of interest so that the substrates 105, 120 are optically transparent and compatible with photonic crystal fabrication. Some example materials for the substrates 105, 120 may include (depending on wavelengths) but are not limited to glass, PMMA, polyimide, plastic material, sapphire, polycarbonates, polymers, zinc-selenide, etc. The first optically transparent substrate 105 and the second optically transparent substrate 120 may be flexible or rigid and may be each configured at a sufficiently thin thickness (e.g., 1-4 mm) to permit the light 25 to pass therethrough. The first pair of discrete display devices 115 may comprise a computer monitor, television monitor, or any other type of electronic display. In some examples, the first pair of discrete display devices 115 may comprise any of a LCD, plasma, LED, OLED, CRT, HD, UHD, and TFT displays. In some examples, the first set of photonic crystal structures 45 and the second set of photonic crystal structures 55 may comprise any of periodic dielectric, metallo-dielectric, and superconductor microstructures or nanostructures, which may be configured as any of one-dimensional, two-dimensional, and three-dimensional crystals.

Figure 8:
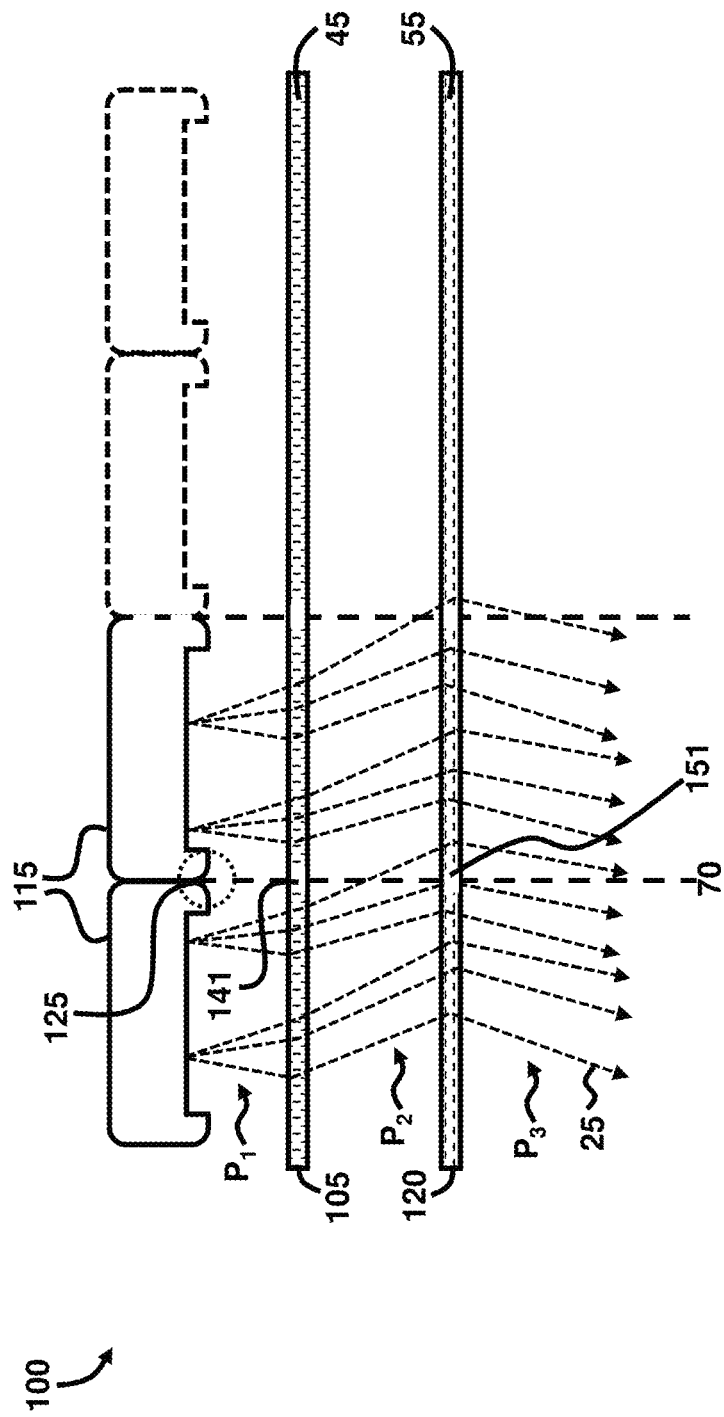
FIG. 8 is a schematic diagram illustrating an optical stitching plane in the apparatus of FIG. 7, according to an embodiment herein.

FIG. 8, with reference to FIGS. 2 through 7, illustrates that a junction 125 of the first pair of discrete display devices 115 creates an optical stitching plane 70, and wherein the first set of photonic crystal structures 45 and the second set of photonic crystal structures 55 are discontinuous at the optical stitching plane 70. According to an embodiment herein, the first set of photonic crystal structures 45 and the second set of photonic crystal structures 55 are each discontinuous at the optical stitching plane 70. Accordingly, there is a first discontinuous zone 141 in the first optically transparent substrate 105 and a second discontinuous zone 151 in the second optically transparent substrate 120 that align with the optical stitching plane 70. This discontinuity at the optical stitching plane 70 permits the first set of photonic crystals 45 and the second set of photonic crystals 55 to be configured at with different angular orientations α, −α.

Figure 9:
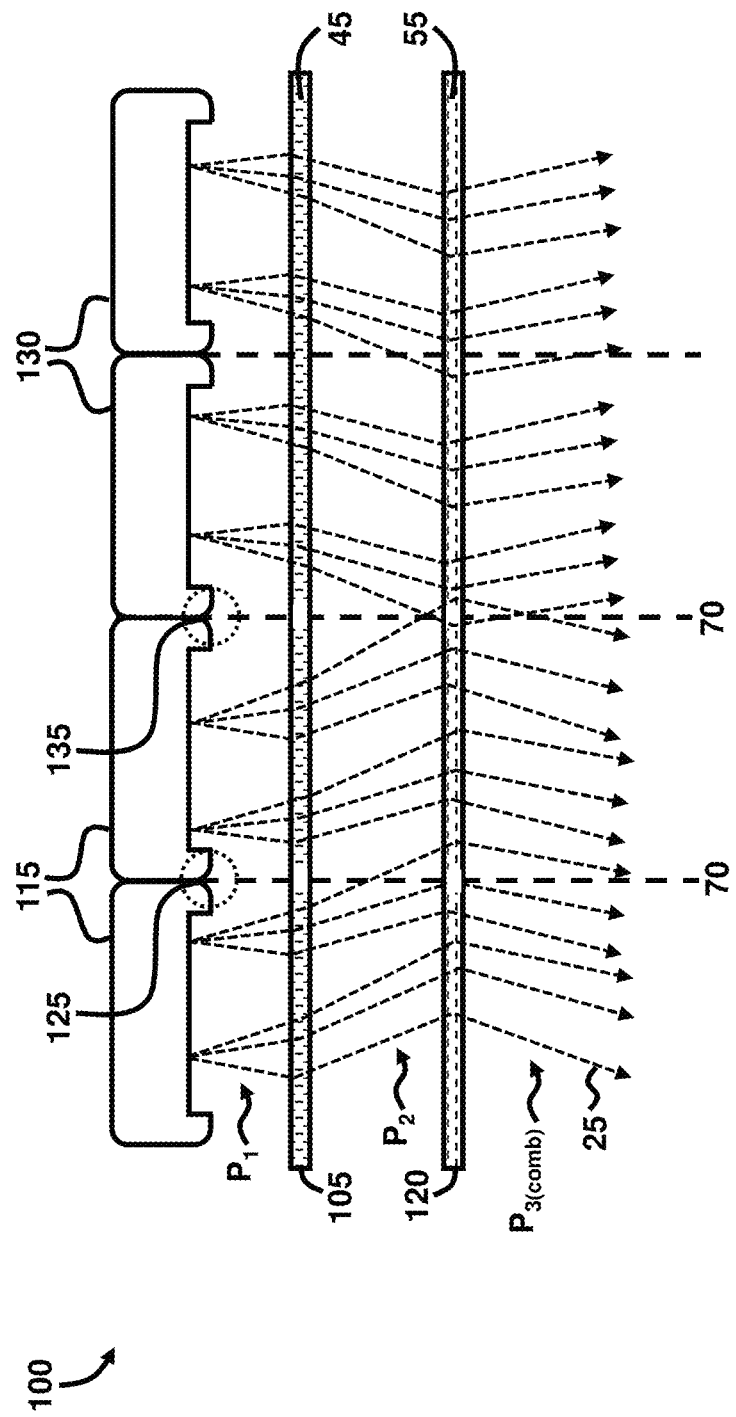
FIG. 9 is a schematic diagram illustrating transformations of paths of light in the apparatus of FIG. 7, according to an embodiment herein.

FIG. 9, with reference to FIGS. 2 through 8, illustrates that the first optically transparent substrate 105 is adapted to receive the first path $P_1$ of light 25 from a second pair of discrete display devices 130. The second pair of discrete display devices 130 may comprise a computer monitor, television monitor, or any other type of electronic display. In some examples, the second pair of discrete display devices 130 may comprise any of a LCD, plasma, LED, OLED, CRT, HD, UHD, and TFT displays. The first pair of discrete display devices 115 and the second pair of discrete display devices 130 display a combined third path $P_{3(comb)}$ of light 25 to include a region 135 comprising the optical stitching plane 70.

Figure 10:
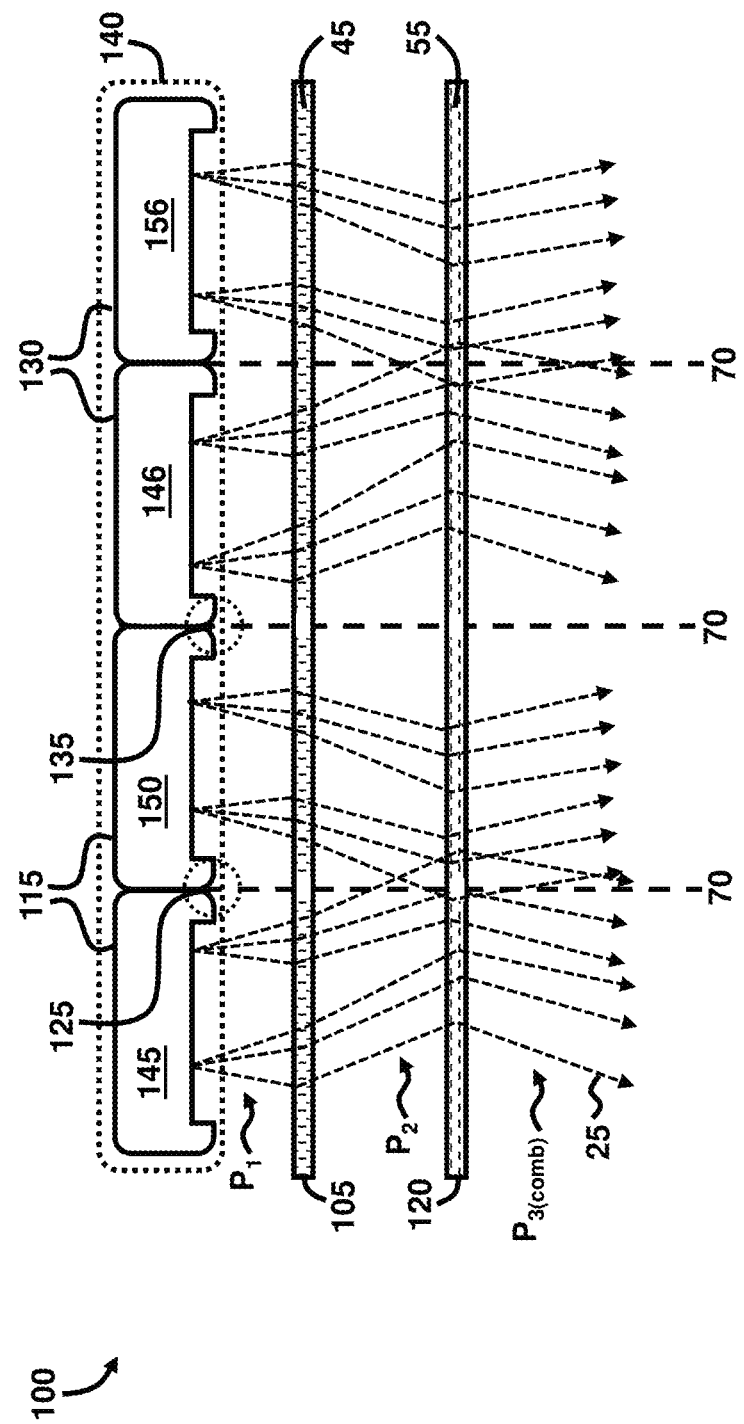
FIG. 10 is a schematic diagram illustrating a two-dimensional array in the apparatus of FIG. 7, according to an embodiment herein.

FIG. 10, with reference to FIGS. 2 through 9, illustrates that the first optically transparent substrate 105 is adapted to receive the first path $P_1$ of light 25 from multiple pairs of discrete display devices 115, 130 arranged in a two-dimensional array 140. Accordingly, the two-dimensional array 140 may contain multiple display devices arranged to enhance the amount of light 25 being output for combination into the third path $P_{3(comb)}$ of light 25. While the drawings illustrate the multiple pairs of discrete display devices 115, 130 being arranged in a planar configuration (e.g., straight) to form the two-dimensional array 140, the embodiments herein may include an example where the multiple pairs of discrete display devices 115, 130 are arranged in a non-planar configuration. In an example, the first path $P_1$ of the light 25 received from a first device 145 of the first pair of discrete display devices 115 is unaltered, and the first path $P_1$ of the light 25 received from a second device 150 of the first pair of discrete display devices 115 is laterally offset toward the first device 145. Similarly, in an example, the first path $P_1$ of the light 25 received from a first device 146 of the second pair of discrete display devices 130 is unaltered, and the first path $P_1$ of the light 25 received from a second device 156 of the second pair of discrete display devices 130 is laterally offset toward the first device 146.

Figure 11:
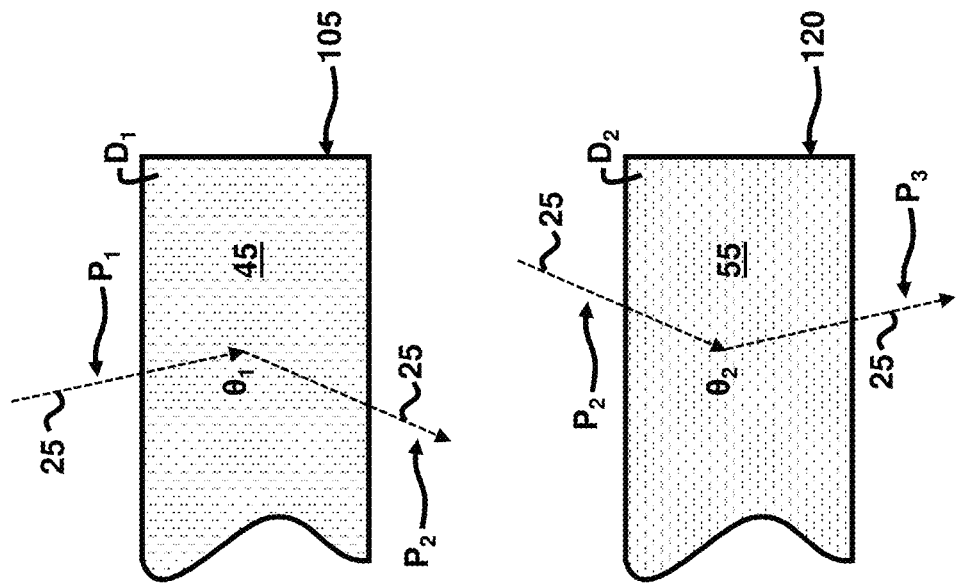
FIG. 11 is a schematic diagram illustrating different light deviation angles in the first and second photonic crystal structures in the apparatus of FIG. 7, according to an embodiment herein.

FIG. 11, with reference to FIGS. 2 through 10, illustrates that the first set of photonic crystal structures 45 and the second set of photonic crystal structures 55 are configured to have opposite light deviation angles $\theta_1$, $\theta_2$ from each other. As used herein, the deviation angle α may correspond to the first angle $\theta_1$, and the deviation angle −α may correspond to the second angle $\theta_2$. In an example, the first set of photonic crystal structures 45 and second set of photonic crystal structures 55 in front of the first device 145 of the first pair of discrete display devices 115 as well as the first set of photonic crystal structures 45 and second set of photonic crystal structures 55 in front of the second device 150 of the first pair of discrete display devices 115 differ in that for the first set of photonic crystal structures 45 in front of the first device 145, the deviations are α, and then −α for the second set of photonic crystal structures 55. However, with respect to the second device 150, the deviations are the opposite; namely, −α for the first set of photonic crystal structures 45 and then a for the second set of photonic crystal structures 55.

FIG. 12, with reference to FIGS. 2 through 11, illustrates an apparatus 200 for combining an output 230 from multiple display devices 205, 210. There is a distance d between a non-viewable display area 215 and a pair of display devices 205, 210. The pair of display devices 205, 210 may comprise a computer monitor, television monitor, or any other type of electronic display. In some examples, the pair of display devices 205, 210 may comprise any of a LCD, plasma, LED, OLED, CRT, HD, UHD, and TFT displays. A pair of optically transparent substrates 105, 120 are aligned with respect to the pair of display devices 205, 210. The pair of optically transparent substrates 105, 120 comprise a first optically transparent substrate 105 and a second optically transparent substrate 120. The first optically transparent substrate 105 is positioned between the pair of display devices 205, 210 and a second optically transparent substrate 120. The pair of optically transparent substrates 105, 120 comprise photonic crystal structures 220, 221, respectively. In some examples, the photonic crystal structures 220, 221 may comprise any of periodic dielectric, metallo-dielectric, and superconductor microstructures or nanostructures, which may be configured as any of one-dimensional, two-dimensional, and three-dimensional crystals. The pair of display devices 205, 210 comprise an output plane 225. Light 25 is output from the pair of display devices 205, 210. The light 25 is combined from the pair of display devices 205, 210 in the non-viewable display area 215 upon projecting the output light 25 through the aligned pair of optically transparent substrates 105, 120.

The process described above is for stitching of two displays devices 205, 210. However, multiple display stitching can be accomplished in a consecutive manner and stitching can be performed in any direction and for any number of display devices. The results of those two stitching operations are then stitched together to yield more than two device stitched output. Odd numbers of outputs are possible in the same way. Likewise, stitching in two dimensions is possible with photonic crystals designed for angular offset in the resultant direction of the two individual desired offsets.

Figure 13A:
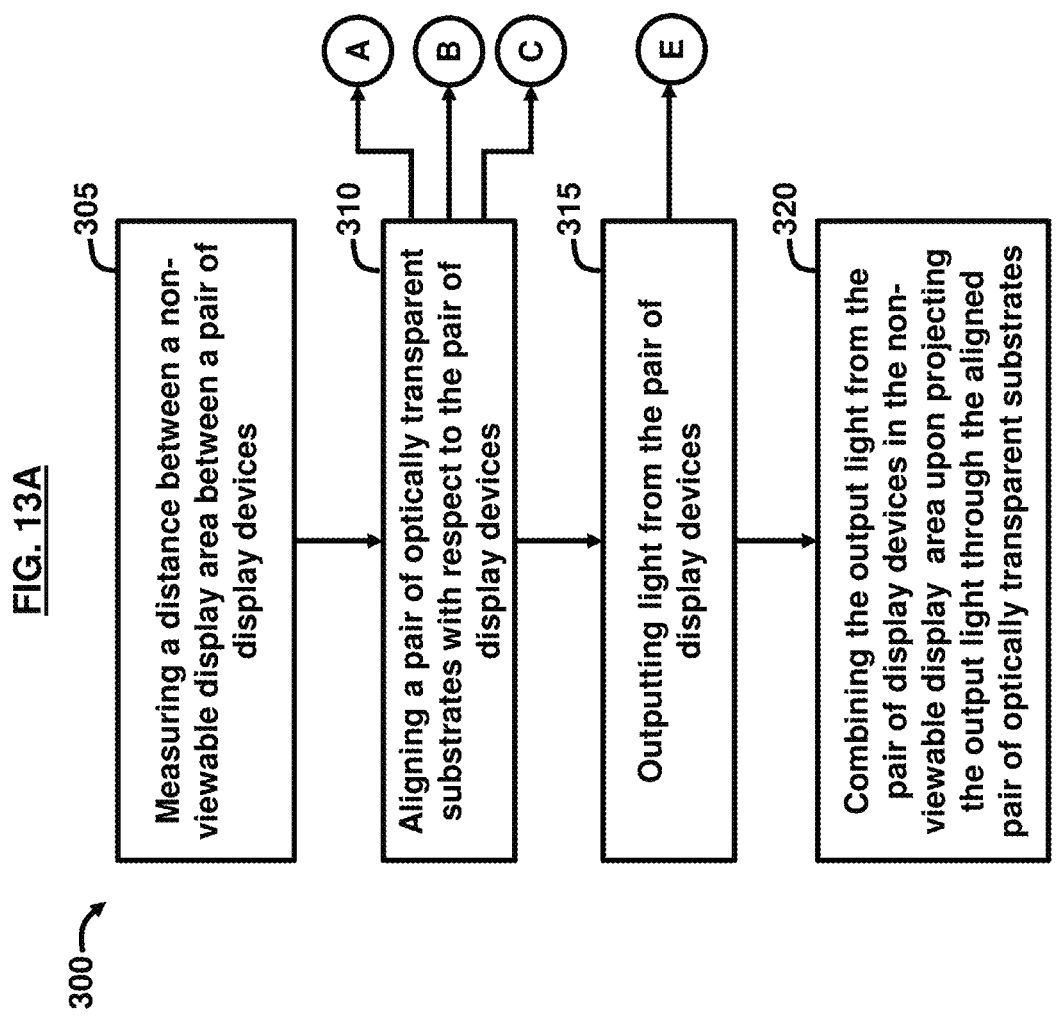
FIG. 13A is a flow diagram illustrating a method of combining an output from multiple display devices, according to an embodiment herein.

FIG. 13A, with reference to FIGS. 2 through 12, is a flow diagram illustrating a method 300 of combining an output 230 from multiple display devices 205, 210, the method 300 comprising measuring (305) a distance d between a non-viewable display area 215 between a pair of display devices 205, 210. The measuring (305) may occur manually or using sensors (not shown) operatively connected to the multiple display devices 205, 210, and calculated using a processor (not shown).

The method 300 comprises aligning (310) a pair of optically transparent substrates 105, 120 with respect to the pair of display devices 205, 210. The pair of optically transparent substrates 105, 120 comprise a first optically transparent substrate 105 and a second optically transparent substrate 120. The first optically transparent substrate 105 is positioned between the pair of display devices 205, 210 and a second optically transparent substrate 120. The pair of optically transparent substrates 105, 120 comprise photonic crystal structures 220, 221. The method 300 comprises outputting (315) light 45 from the pair of display devices 205, 210. The light 25 may be emitted in a substantially uniform manner or may be directed non-uniformly according to various examples. The method 300 comprises combining (320) the output light 25 from the pair of display devices 205, 210 in the non-viewable display area 215 upon projecting the output light 25 through the aligned pair of optically transparent substrates 105, 120.

FIG. 13B, with reference to FIGS. 2 through 13A, is a flow diagram illustrating that in the method 300, the process of aligning (310) comprises calibrating (325) a distance of the first optically transparent substrate 105 to the pair of display devices 205, 210. In an example, the process of calibrating (325) may occur manually or using sensors (not shown) operatively connected to the multiple display devices 205, 210, and calculated using a processor (not shown). The distance between the first optically transparent substrate 105 and the pair of display devices 205, 210 may be adjusted accordingly. The adjustment may be based, in part, on the type of the pair of display devices 205, 210 and the configuration (i.e., thickness, etc.) of the first optically transparent substrate 105.

FIG. 13C, with reference to FIGS. 2 through 13B, is a flow diagram illustrating that in the method 300, the process of aligning (310) comprises calibrating (330) a distance of the second optically transparent substrate 120 to the first optically transparent substrate 105. In an example, the process of calibrating (330) may occur manually or using sensors (not shown) operatively connected to the multiple display devices 205, 210, and calculated using a processor (not shown). The distance between the first optically transparent substrate 105 and the second optically transparent substrate 120 may be adjusted accordingly. The adjustment may be based, in part, on the configuration (i.e., thickness, etc.) of the first optically transparent substrate 105 and the second optically transparent substrate 120.

FIG. 13D, with reference to FIGS. 2 through 13C, is a flow diagram illustrating the method 300 comprises calibrating (335) a light deviation angle α of the photonic crystal structures 220 in the pair of optically transparent substrates 105, 120. In an example, the calibration of the light deviation angle α may occur by applying any of an electrical, magnetic, and electromagnetic signal to the pair of optically transparent substrates 105, 120 thereby causing a change in the orientation (e.g., a change in the light deviation angle α or −α) of the photonic crystal structures 220, 221 in the pair of optically transparent substrates 105, 120, respectively.

FIG. 13E, with reference to FIGS. 2 through 13D, is a flow diagram illustrating the method 300 comprises calibrating (340) the light deviation angle α to be between approximately 15° to 20°, according to one example. In other embodiments, the light deviation angle α may be at other suitable angles based on the calibration process and/or a desired user preference. For example, the light deviation angle α may be 80° or more, in other embodiments.

FIG. 13F, with reference to FIGS. 2 through 13E, is a flow diagram illustrating the method 300 comprises planarizing (345) an output plane 225 of the pair of display devices 205, 210. In this regard, the output plane 225 may be configured to be perpendicular and straight with respect to the pair of display devices 205, 210 to ensure that the pair of display devices 205, 210 are not rotated with respect to a user positioned in front of the second optically transparent substrate 120 to permit as clear an image as possible for viewing.

The embodiments herein provide a technique for optically combining ("stitching") two or more displays (monitors, televisions, etc.) or spatial light modulators (SLMs) in such a way that their frames are not visible in the final output. This allows for small format, low cost SLMs to be effectively combined into large format SLMs with much lower total cost than a comparable single large format device (if fabrication was possible at all). Similarly, large area displays could be accomplished beyond the limit of current monitor sizes (around 90 inch). The stitching method allows for stitching of two devices at a time, but can be cascaded to stitch more than two devices.

The embodiments herein utilize a novel application of photonic crystals to redirect outputs of monitors in such a way that the active pixel regions of each device (SLM, monitor, etc.) are made adjacent to each other without a hard frame around each device. In the event there is an output radiance dropoff near the edges of the devices that are being stitched, this dropoff, which can reach 50%, can be compensated by operating the remainder of the device at half power with the decreased radiance regions being operated at full power (or as appropriate) to make the total output uniform. This may cause the device to effectively lose half of its output power. Rather than operating at low power as compensation, the region of stitching can be tolerated as a slightly darker band if permitted.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A system comprising:
   a first display device comprising a first set of pixels adapted to output light;
   a second display device comprising a second set of pixels adapted to output light;
   a first transparent plate spaced apart from each of the first display device and the second display device, wherein the first transparent plate comprises a first set of photonic crystal structures arranged in a first direction and adapted to deviate a first path of the light transmitted from the first and second set of pixels at a first angle; and
   a second transparent plate spaced apart from the first transparent plate and comprising a second set of photonic crystal structures arranged in a second direction different from the first direction and adapted to deviate a second path of the light transmitted through the first transparent plate at a second angle to create a third path of light, wherein:
   the first display device comprises a first frame that does not contain the first set of pixels, and wherein the second display device comprises a second frame that does not contain the second set of pixels,
   the first display device and the second display device are proximate to one another such that the first frame and the second frame are aligned to create an optical stitching plane that does not contain the first set of pixels and the second set of pixels, and wherein the optical stitching plane comprises an image viewing area overlapping a portion of the first frame and the second frame, and
   first transparent plate and the second transparent plate each extend a combined length of the first display device and the second display device, and wherein the first set of photonic crystal structures and the second set of photonic crystal structures are each discontinuous at the optical stitching plane.

2. The system of claim 1, wherein the third path of light permits a display of light in the image viewing area.

3. The system of claim 1, wherein the first set of photonic crystal structures arranged in the first direction is adapted to deviate the first path of the light in a first angular deviation, and wherein the second set of photonic crystal structures arranged in the second direction is adapted to deviate the second path of the light in a second angular deviation that is opposite to the first angular deviation.

4. The system of claim 3, wherein the first angular deviation is a for the first set of photonic crystal structures and the second angular deviation is $-\alpha$ for the second set of photonic crystal structures with respect to the first transparent plate and the second transparent plate arranged in front of the first display device.

5. The system of claim 3, wherein the first angular deviation is $-\alpha$ for the first set of photonic crystal structures and the second angular deviation is $\alpha$ for the second set of photonic crystal structures with respect to the first transparent plate and the second transparent plate arranged in front of the second display device.

6. An apparatus comprising:
a first optically transparent substrate comprising a first set of photonic crystal structures adapted to deviate a first path of the light received from a first pair of discrete display devices; and
a second optically transparent substrate spatially aligned with the first optically transparent substrate and comprising a second set of photonic crystal structures adapted to deviate a second path of the light transmitted through the first transparent substrate to create a third path of light wherein:
a junction of the first pair of discrete display devices creates an optical stitching plane, and wherein the first set of photonic crystal structures and the second set of photonic crystal structures are discontinuous at the optical stitching plane.

7. The apparatus of claim 6, wherein the first optically transparent substrate is adapted to receive the first path of light from a second pair of discrete display devices, and wherein first pair of discrete display devices and the second pair of discrete display devices display a combined third path of light to include a region comprising the optical stitching plane.

8. The apparatus of claim 7, wherein the first optically transparent substrate is adapted to receive the first path of light from multiple pairs of discrete display devices arranged in a two-dimensional array.

9. The apparatus of claim 6, wherein the first set of photonic crystal structures and the second set of photonic crystal structures are configured to have opposite light deviation angles from each other.

10. The apparatus of claim 6, wherein the first path of the light received from a first device of the first pair of discrete display devices is unaltered, and wherein the first path of the light received from a second device of the first pair of discrete display devices is laterally offset toward the first device.

\* \* \* \* \*